United States Patent Office 3,824,120
Patented July 16, 1974

---

3,824,120
SILICON NITRIDE ARTEFACTS
Roger William Davidge, Wantage, and Anthony Glyn Evans, Didcot, England, assignors to United Kingdom Atomic Energy Authority, London, England
Filed June 25, 1971, Ser. No. 156,712
Claims priority, application Great Britain, July 1, 1970, 32,011/70
Int. Cl. C23c *11/08;* C23d *5/00*
U.S. Cl. 117—98                                                     5 Claims

ABSTRACT OF THE DISCLOSURE

Increased strength is imparted to porous silicon nitride by subjecting the silicon nitride to controlled oxidation such that the surfaces of the internal pores are oxidized.

BACKGROUND OF THE INVENTION

This invention relates to silicon nitride artefacts and is concerned with a process for treating artefacts containing porous silicon nitride with a view to increasing their strength.

SUMMARY OF THE INVENTION

The invention provides a method of increasing the strength of an artefact containing porous silicon nitride, which contributes to the strength of the artefact, which method comprises subjecting the silicon nitride to controlled oxidation for oxidizing the surfaces of the internal pores.

Whilst this method is particularly appropriate for treating porous silicon nitride artefacts, it is also useful, for example, for treating an artefact of silicon carbide which is bonded with silicon nitride, or other artefacts containing silicon nitride in which the silicon nitride contributes to the strength of the artefact. Artefacts to which the treatment may be applied include silicon nitride reinforced with fibrous material, such as fine tungsten wires coated with silicon carbide, graphite fibres coated with silicon carbide, or graphite fibres.

Preferably the oxidation is controlled by selection of temperature and time such as to achieve optimum oxidation of the surfaces of internal pores before the pores are closed by formation of a continuous layer of oxide on the structural surface of the artefact.

The oxidation of reaction sintered silicon nitride occurs in two well-defined stages, the relative importance of which depends on temperature and time. For a material containing, for example, 21% open porosity two stages of oxidation can be identified. During the first stage (stage I) both internal and external surfaces are oxidized, until the external surface oxide layer closes the pore openings and inhibits further internal surface oxidation. During the second stage (stage II), when internal oxidation is inhibited, oxidation is substantially limited to the external surfaces. For stage I oxidation to occur it is necessary that there is no continuous inhibitive film covering the external surfaces and that the pores are not completely filled with other material. Because the internal surface area is much greater than the external surface area oxidation in stage I is much more rapid than in stage II.

In one example of silicon nitride artefact of density $2.5 \times 10^3$ kg. m.$^{-3}$, it has been found that at 1000° C. most of the oxidation is internal and the sole oxidation product is silica. A 1% weight gain is equivalent to 2.8 wt. percent $SiO_2$. There is a large volume increase on oxidation and 1 volume of $Si_3N_4$ produces 1.8 volumes of $SiO_2$. To fill completely all the pores requires a weight gain of 9% and thus the pores are ~60% filled after 150 h. at 1000° C. The weight gain is accurately proportioned to (time)$^{1/2}$ for times <36 h. indicating that there is little sealing-off of pores and that oxidation is limited by a diffusional process through the silica. For longer oxidation times the oxidation rate gradually falls because of gradual sealing off of pores and after 100 h. a mainly continuous undulating surface layer is present with only a few channels still open.

The transition from stage I to stage II occurs at very short times on oxidation at 1200° and 1400° C., because a continuous surface film is rapidly formed, and only 3–5 wt. percent $SiO_2$ is formed on internal surfaces.

The silica formed on oxidation is present at room temperature as predominantly α-cristobalite. β-cristobalite is presumably formed during oxidation and is converted to the α-form on cooling through 270 to 200° C.

The invention includes an artefact containing silicon nitride, which contributes to the strength of the artefact, when treated by any of the aforesaid methods.

The invention further includes an artefact containing porous silicon nitride, which contributes to the strength of the artefact, wherein the surfaces of the internal pores of the silicon nitride are coated with a substantial layer of silicon dioxide formed by high temperature oxidation treatment. The porous silicon nitride may be reaction sintered silicon nitride.

BRIEF DESCRIPTION OF THE DRAWINGS

The nature of the invention will be more readily understood from the following description of a number of experiments and their results given by way of example to illustrate treatments and artefacts embodying the invention. Reference will be made to the accompanying drawings in which.

The drawings relate to experiments carried out with a reaction sintered silicon nitride artefact of density $2.5 \times 10^3$ kg. m.$^{-3}$.

Figure 1:
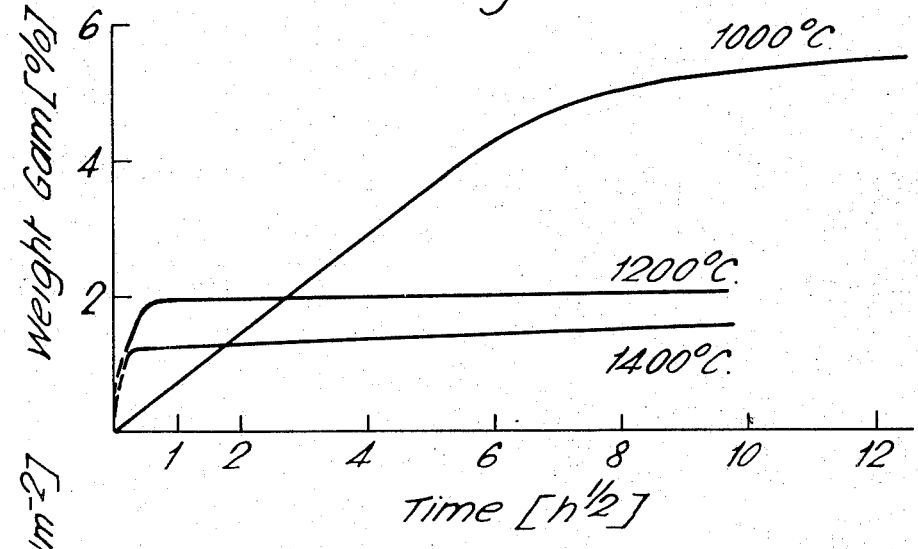
FIG. 1 is a series of curves relating gain in weight to oxidation time at various temperatures.

FIG. 1 shows the gain in weight of individual artefacts as a function of the oxidation time at 1000° C., 1200°, and 1400° C. in still air. A (time)$^{1/2}$ axis is used, on the assumption that the oxidation behaviour is governed by a simple diffusion-controlled process. There are clearly two stages of oxidation. At 1000° C. there is an initial linear stage (I) which tends to completion in 3–4 days. At 1200° and 1400° C. Stage I is essentially complete in very short times <15 min. The rate of oxidation in stage I increases whilst the amount of oxidation decreases with increase in temperature. At 1200° and 1400° C. there is a second stage (II) which is also linear. The rate of oxidation is very much lower in stage II and the rate again increases with increase in temperature. The linear stage II at 1000° C. is not evident in FIG. 1 but presumably occurs at times >4 days.

X-ray diffraction analysis of oxidized materials, at 25° C., indicates that oxidation at temperatures from 1000° to 1400° C. produces cristobalite. The lower the temperature the larger is the quantity of cristobalite formed after extensive exposure to air. This correlates with the relative quantities of oxide formed as determined from weight gain experiments (FIG. 1). At 25° C. the cristobalite is present predominantly in the α-form although traces of the β-form are present in some samples.

Scanning electron microscope observations of the surfaces and fracture faces of unoxidized and oxidized specimens reveal a number of important features. A polished surface of an unoxidized specimen revealed flat polished plateaux and a background of porous matte.

Oxidation at 1200° and 1400° C. for times >½ h. produced a relatively smooth dense surface layer which severely cracked.

Oxidation at 1000° C. is quite different. The surface retains much of the undulation of the unoxidized surface so that the larger surface pores are not sealed off for times <100 h. Also, no cracks appear on any part of the surface. Examination of the fracture face of a specimen oxidized for 100 h. showed that the oxide layer at the surface was 1 to 2 μm. thick.

The very different appearance of the surfaces of specimens oxidized at 1000° C. and 1200° C. or 1400° C. indicates that the oxide must have relatively low viscosity at the higher temperatures, so that it can run into the pores to generate the flat surfaces.

Several series of strength measurements have been made as a function of temperature before and after thermal treatments in air at high temperature.

Figure 2:
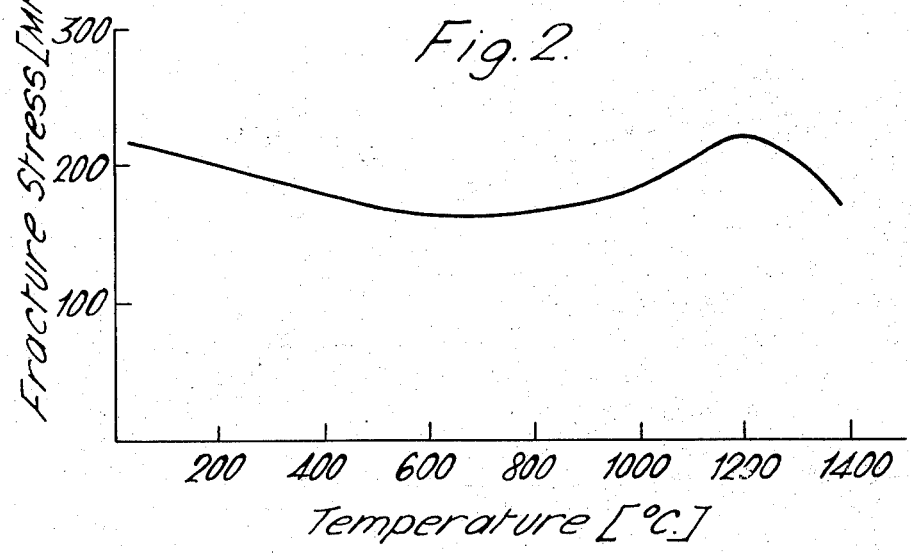
FIG. 2 is a curve relating fracture stress to temperature in an untreated artefact.

The temperature dependence of the strength of untreated as fabricated material is given in FIG. 2. With increase in temperature, the strength first falls slightly, rises to a peak at 1200° C. and then falls again.

Figure 3:
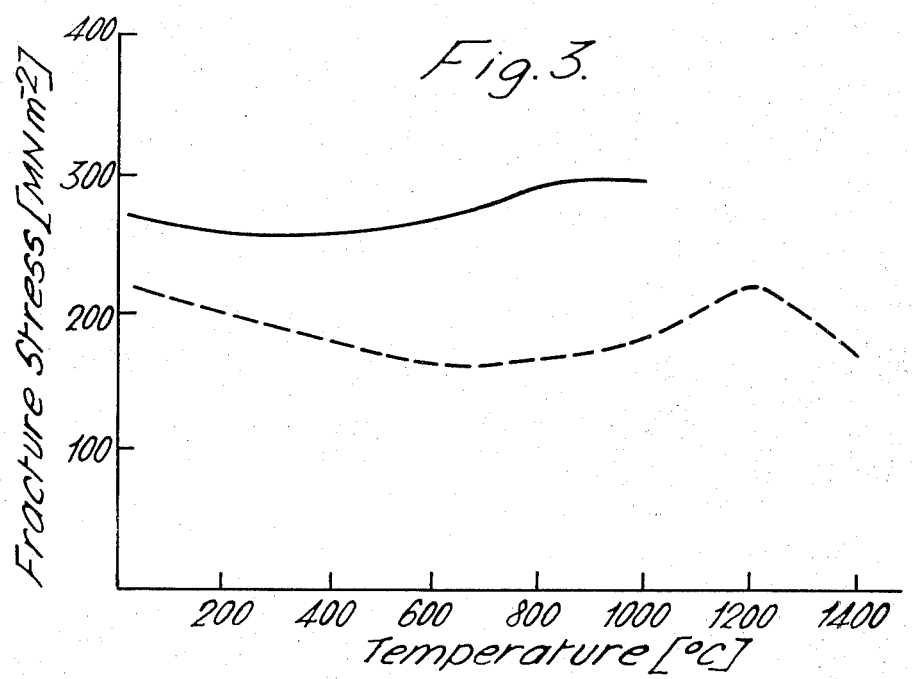
FIG. 3 is a similar curve for a treated artefact.
Figure 4:
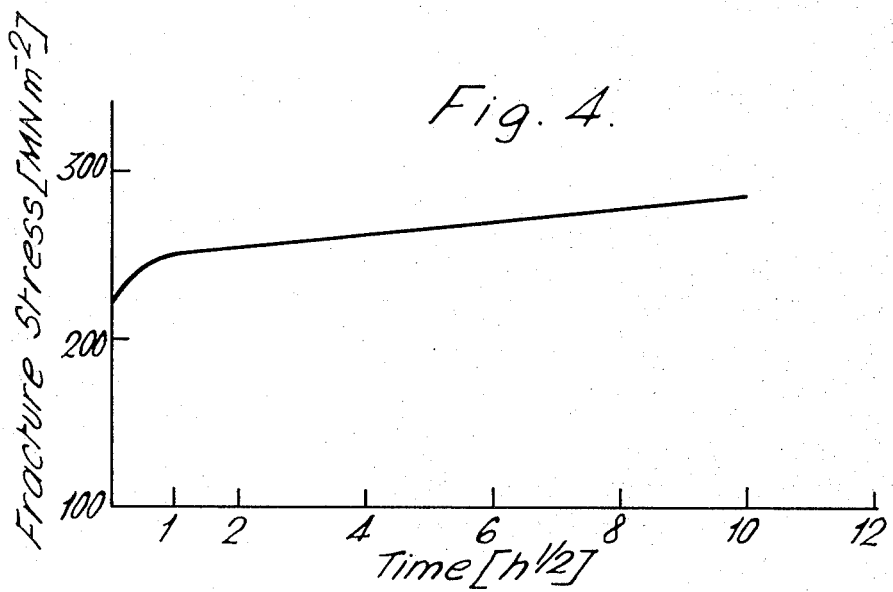
FIG. 4 is a curve relating strength at 25° to oxidation time at 1000° C.

For material of this example treated by heating in air for 96 h. at 1000° C., cooled to room temperature and then tested at temperatures <1000° C., the strength is increased at all temperatures (FIG. 3). A few specimens were heated to 1000° C. for 96 h. and then tested at 1000° C., or below without first cooling to room temperature. The strength was again enhanced by an amount similar to that of specimens first cooled to room temperature. FIG. 4 shows how the strength at 25° C. varies with time of oxidation at 1000° C. There is an initial rapid rise in 1 h. and then a slow steady increase for longer times.

Comparison of FIGS. 1 and 4 shows that it is the early stages of oxidation that are most effective in increasing strength. Half the strength increase occurs after 1 h. oxidation when the weight gain is only 0.75%. The oxidation in 1 h. is unlikely to significantly reduce the size of flaws, which suggests that the strength increase is due mainly to rounding of flaws. The strength is increased at all temperatures irrespective of whether the specimens are cooled directly to temperature or via 25° C.

This example illustrates the increase in strength that may be achieved with comparatively high density material ($2.5 \times 10^3$ kg. m.$^{-3}$). Thus, treatment in air for nearly 100 hours at 1000° C. resulted in 20% convertion of silicon nitride to silicon dioxide and bend strength at room temperature was increased from 220 to 280M Nm.$^{-2}$.

Reaction sintered silicon nitride, as normally produced, has a density in the range 2.0 to $2.7 \times 10^3$ kg. m.$^{-3}$ (corresponding to 37 to 15% porosity). The porosity is mainly of the open type.

It has been found that the treatment, according to the present invention, has even greater effect upon the strength of low density material. Further, for low density material, it is acceptable to use a higher treatment temperature, the oxidation of the internal surfaces continuing to a satisfactory extent, and more rapidly because of the higher temperature, before the openings to the pores are closed by formation of a continuous coating on the external surface.

Thus in another experiment material of density $1.9 \times 10^3$ kg. m.$^{-3}$ was heated in air for 1 hour at 1300° C. 32% of the silicon nitride was converted to silicon dioxide and the bend strength at room temperature was increased from 100 to 240M Nm.$^{-2}$.

It will be appreciated that, once having appreciated the phenomena involved and the desirability of achieving oxidation of internal surfaces as taught by the present invention, the precise conditions of control of oxidation have to be determined empirically for the particular material chosen. The choice of conditions will depend upon the density of the silicon nitride, the nature of the artefact, and an optimized choice of temperature and time of treatment according to the improvement in strength desired. The principal requirement is for the temperature not to be so high that external surface oxidation closes the pore openings before the required degree of internal oxidation has been achieved.

The invention is not restricted to the details of the foregoing examples. For instance, air need not necessarily be used as the oxidizing agent. Oxygen or any other suitable oxidizing agent may be employed.

We claim:

1. A method of increasing the strength of an artefact containing porous silicon nitride having internal pores, which contributes to the strength of the artefact, which method comprises subjecting the silicon nitride to oxidation in an atmosphere capable of oxidizing silicon nitride to silicon dioxide the temperature during oxidation being controlled such that the surfaces of the internal pores of the silicon nitride are oxidized to silicon dioxide.

2. A method as claimed in claim 1, wherein the oxidation is controlled by selection of temperature and time such as to achieve optimum oxidation of the surfaces of internal pores before the pores are closed by formation of a continuous layer of oxide on the structural surface of the artefact.

3. A method as claimed in claim 1, wherein for an artefact containing silicon nitride of density $2.5 \times 10^3$ kg. m.$^{-3}$, the oxidation treatment is carried out in air at about 1000° C.

4. An artefact containing porous silicon nitride having internal pores, which contributes to the strength of the artefact, wherein the surfaces of the internal pores of the silicon nitride are coated with a substantial layer of silicon dioxide formed by high temperature oxidation treatment.

5. An artefact as claimed in claim 4, wherein the porous silicon nitride comprises reaction sintered silicon nitride.

References Cited
UNITED STATES PATENTS

| | | | |
|---|---|---|---|
| 3,455,729 | 7/1969 | Peeley et al. | 117—106 R |
| 3,558,348 | 1/1971 | Rand | 117—106 R |
| 3,422,321 | 1/1969 | Tombs | 117—106 R |
| 3,706,596 | 12/1972 | Wallouch | 117—70 |

OTHER REFERENCES

Berezhoni, A. S.: *Silicon and its Binary Systems*, Consultants Bureau, New York, 1960, pp. 92 and 93.

CHARLES E. VAN HORN, Primary Examiner

J. MASSIE, Assistant Examiner

U.S. Cl. X.R.

117—70 R, 106 A, 169 A